May 31, 1949.                J. R. MAHAN                2,471,827
                          WELDED GEAR BLANK
                        Filed April 27, 1946
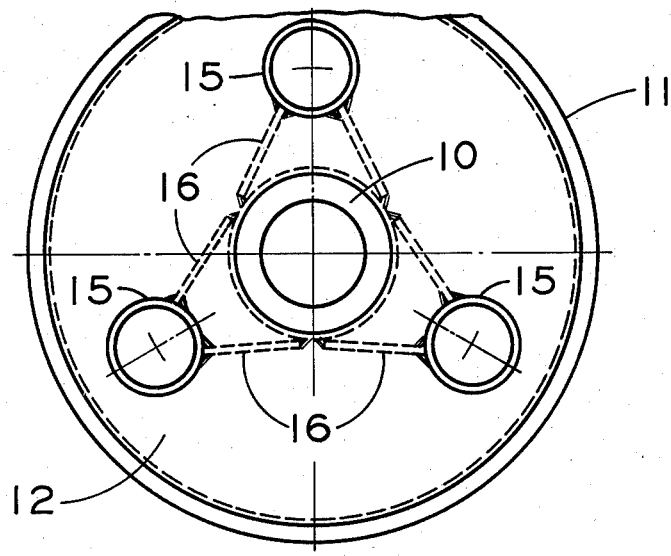
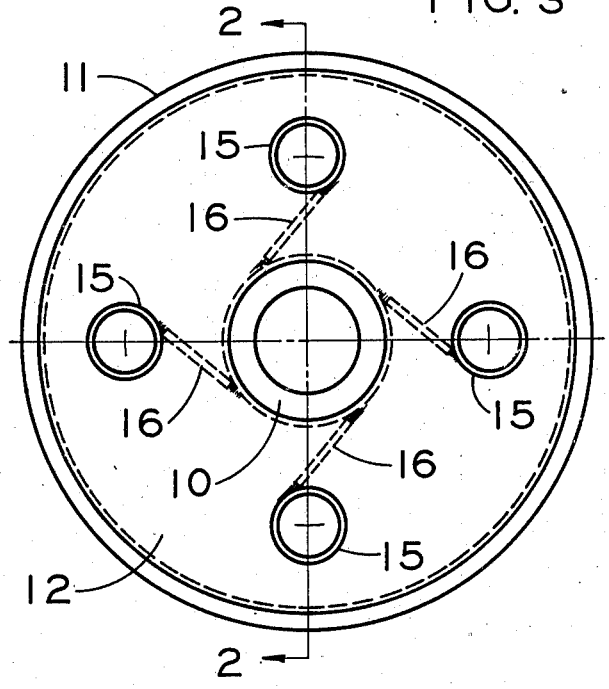
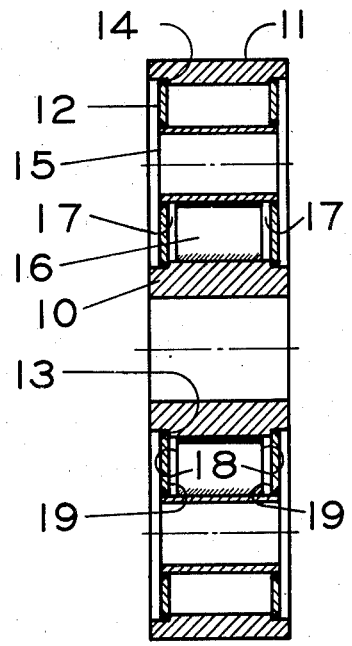
INVENTOR
Joseph R. Mahan
BY C. Verne Martin
ATTORNEY Patented May 31, 1949

2,471,827

UNITED STATES PATENT OFFICE 2,471,827

WELDED GEAR BLANK

Joseph R. Mahan, Toledo, Ohio, assignor to The National Supply Company, Pittsburgh, Pa., a corporation of Pennsylvania Application April 27, 1946, Serial No. 665,486

5 Claims. (Cl. 74—434)

My invention relates to welded assemblies, particularly gear blanks, wheels and the like, so constructed that all the joints to be welded are freely accessible from the exterior and the finished product is rigid enough to withstand severe usage and be relatively free from deflection, lateral oscillation and vibration.

Gears used for power transmission in heavy duty service must be exceedingly strong and of rigid construction. Great care must be exercised in the fabrication of such gear blanks and the like when made up from a plurality of elements welded together. If the gear is to be provided with helical teeth extreme caution must be taken to guard against deflection, lateral oscillation and vibration. It is generally recognized that there is considerable more lateral pressure set up at the point of tooth contact in a helical gear than in other types. If the entire welded assembly is not sufficiently rigid, the tooth pressure exerted on the face of the gear may be great enough to deflect the face of the gear to a degree that will have a detrimental effect upon satisfactory operation.

It is the principal object of my invention to provide a welded assembly made up from a plurality of separate elements to form an integral structure wherein said structure is given axial rigidity, resulting in a reduction of deflection, lateral oscillation and vibration.

Another object of my invention is to provide a fabricated gear blank or the like wherein all inside welding operations are eliminated and a sufficiently rigid gear blank is produced capable of withstanding torsional strains and heavy side thrusts at its tooth contact surface without undue deflection or lateral oscillation.

Another object of my invention is to provide a fusion welded assembly in which a plurality of spacers and stiffener plates welded thereto provide a lateral or sway bracing to prevent lateral oscillation of the assembly when exposed to excessive side thrust at its periphery.

Another object of my invention is to provide a fabricated gear blank or the like wherein stiffener plates, used to help eliminate lateral oscillation and deflection, are welded in place prior to the final assembly welding of the web plates to avoid the inconvenience of welding in difficult and obscure places.

Another object of my invention is to provide an improved and simplified welded wheel or gear blank which is sturdy and economical to manufacture.

Further objects and advantages of my invention will become apparent during the course of the following description and appended claims in connection with the accompanying drawings illustrating the preferred and alternate constructional embodiments of my invention. It should be understood, however, that the disclosure is illustrative of the principles of my invention in its broader aspects.

In the drawings:

Fig. 1 is a side elevational view of a gear blank fabricated in accordance with the preferred form of my invention.

Fig. 2 is a cross-sectional view of Fig. 1 taken on the line 2—2 of Fig. 1.

Fig. 3 is a side elevational view, partly broken away, of a gear blank fabricated in accordance with my invention featuring an alternate construction using dual stiffener plates attached to each spacer.

The gear blank comprises a rigid steel hub 10 and a forged steel rim 11, preferably of hardenable steel secured in axial spaced relationship to each other by a pair of web plates 12. The web plates 12 rest upon external shoulders 13 on the hub 10 and upon internal shoulders 14 in the bore of the rim 11, positioned in the same plane with the shoulders on the hub. The plates 12 are secured to these shoulders and against axial movement by welding as will be explained later.

A plurality of spacers 15 are mounted between and secured to the web plates 12 intermediate the hub 10 and rim 11 to maintain the plates 12 in axial spaced relation to each other and to prevent axial deflection of the rim due to the lateral component of the load on the gear teeth. These spacers provide a lateral or sway bracing effect to the structure.

A plurality of stiffener plates 16 are permanently secured, as by welding, to the hub 10 and spacers 15. A clearance space 17 is provided between the end face 18 of the stiffener 16 and the face 19 of the web 12. The stiffeners add materially to the sway bracing effect of the spacers. They assist in building up an integral structure between the hub and spacers, adding strength and axial rigidity to the complete assembly, at the same time tending to reduce deflection, lateral oscillation and vibration in the built-up gear blank or wheel.

The process of fabricating my improved gear blank or wheel is very simple and economical to manufacture. The rim 11 may be made of a very different grade or type of steel than the balance of the structure. The usages to which heavy duty gears or wheels are subjected require that the rim or face of the gear blank, wherein the teeth are cut, or the face of the wheel, be made of a steel which can be hardened or heat treated to improve its physical characteristics and wearing qualities. The balance of the assembly is usually composed of a mild steel having a ductile nature that will absorb severe shocks and heavy strains without taking a permanent deflected set such that the gear face will be out of balance and axial alignment with the bore of the hub. A structure adapted to the use of a rim capable of being heat-treated can be produced with my improved construction much more readily than can be done with a steel casting or an integrally forged gear blank and much more economically than the old time method of shrinking a hardened face on a soft blank.

The hub 10 and the rim 11 are rough machined all over and shoulders 13 and 14 are provided on the hub 10 and in the rim 11 as mentioned above. The web plates 12 are machined to closely fit on the shoulders above referred to. One of the web plates 12 is mounted on one shoulder of the hub 10 and tack welded in position. The partial assembly is then turned over and a plurality of spacers 15 are set in position in their corresponding holes in the bottom or first assembled web plate 12. I prefer to use pipe for these spacers to combine strength with light weight and ease of handling the assembly. The holes in the web plates are spaced equidistant about the face of the plate, intermediate its bore and periphery. In order to keep the spacers in axial alignment with the bore of the hub the second or top web plate 12 is set upon the exposed shoulder of the hub and the free ends of the spacers. The spacers are then tack welded to the lower web plate.

A plurality of stiffener plates 16 are first tack welded in position between the periphery of the hub 10 and their respective spacers as shown in Figs. 1 and 3. It will be noted from Fig. 1 that in the preferred construction the stiffener plates are set so that they are substantially tangent to both the hub and their respective spacer. This construction provides for considerable variation in the length of the stiffener plates and adapts itself to ease in welding in that the stiffeners may be so positioned as to provide the most advantageous groove for welding. In Fig. 3 a double set of stiffener plates 16 are used. Two stiffener plates radiate from each spacer to approximately a point of tangency on the hub 10. This construction gives the effect of an equilateral triangular brace. After all the stiffener plates are tack welded into position they are permanently welded to the hub 10 and spacers 15. It will be remembered, as noted above, the stiffener plates do not contact either web plate 12.

After the stiffener plates have been permanently welded into position the top web plate 12 is removed and the rim 11, which has been preheated to between 300° and 400° F. to relieve shrinkage or contraction strains in welding, is set down over the lower web plate 12 so that the internal shoulder 14 in the rim rests squarely upon the inner surface of the lower web plate. The top web plate 12 is then set in the same position as before, making sure that its bore and periphery rest respectively upon the exposed shoulders 13 and 14 provided on the hub 10 and in the rim 11. The free ends of the spacers re-engage the holes in the top web plate 12. The web plates are now tack welded to their component parts and the entire assembly is mounted upon a fixture where the web plates are fusion welded to the rim and hub by a continuous welding process. During the welding operation the rim retains a substantial amount of the heat previously transmitted to it, thus providing for the relief of contraction strains set up during the cooling of the weld. The spacers are permanently welded in place to complete the fabrication of the gear blank. The spacers welded to the web plates act as diagonal or sway braces to restrain the lateral movement of the gear face with respect to the hub. The stiffener plates welded to the spacers and hub further stiffen the completed structure.

It will be noted that all the welding is performed externally of the structure and in no case is it necessary to make any welds on the inside or in obscure places. Furthermore, I use only two web plates and a plurality of spacers with stiffeners welded thereto to provide sufficient resistance to deflection of the gear blank to eliminate lateral oscillation and vibration when the gear is subjected to severe lateral thrust such as is common in the use of heavy duty helical gears.

While only the preferred and one alternate form of my invention have been disclosed and described herein, it should be understood that many changes may be made therein without departing from the spirit of the invention in its broader aspects and I do not wish to be limited or restricted to the specific details set forth but wish to reserve to myself any further embodiments, modifications and variations that may appear to those skilled in the art or fall within the scope of the appended claims.

Having fully disclosed and described my invention, what I claim as new and desire to secure by United States Letters Patent is:

1. A welded metallic structure provided with a hub and a rim, a pair of web plates to support said rim and welded to said hub and rim in spaced axial relation to each other, a plurality of spacers welded between said plates intermediate the hub and rim, a plurality of stiffener plates welded substantially tangential to the periphery of said hub and connected by welding with said spacers in a plane parallel to the axis of said hub, adapted to give axial rigidity to the structure, and reduce deflection, lateral oscillation and vibration to a minimum.

2. A welded metallic structure provided with a hub, together with a rim of hardened steel, a pair of web plates to support said rim and secured to said hub and rim in spaced axial relation to each other and welded integrally therewith, a plurality of spacers mounted between said plates and welded thereto intermediate the hub and rim, a plurality of stiffener plates welded about the periphery of said hub and extending in substantially tangential directions therefrom to contact said spacers substantially tangential their periphery and welded thereto in a plane parallel to the axis of said hub, but free from contact with said web plates and adapted to give axial rigidity to the structure and reduce deflection, lateral oscillation and vibration to a minimum.

3. A welded metallic structure provided with a hub and a prefabricated rim, said hub and rim being provided with external and internal shoulders respectively at their extreme ends, a pair of web plates seating on said shoulders and welded to said hub and rim, a plurality of apertures in each web plate, the apertures in one plate registering with those in the other plate, a plurality of pipe spacers inserted in said apertures in said webs and welded thereto, said spacers being positioned intermediate the hub and rim, a plurality of stiffener plates welded substantially tangential to the periphery of said hub and contacting the periphery of said spacers and welded thereto and clearance provided between the end surfaces of said stiffeners and said webs.

4. A welded assembly comprising a rigid metallic hub, a forged steel rim, a pair of web plates having edges connected by welding to said hub and rim, a plurality of spacers mounted between said plates and welded thereto intermediate said hub and rim, a plurality of stiffener plates extending in substantially tangential directions from said hub to said spacers and welded at their respective ends to said hub and spacers.

5. A welded assembly comprising a rigid metallic hub, a metallic rim, a pair of web plates welded at their respective inner and outer edges to said hub and rim to secure said hub and rim in spaced relationship concentric with each other, a plurality of pipe spacers mounted between said web plates and welded thereto intermediate said hub and rim, a plurality of stiffener plates welded about the periphery of said hub and extending in substantially tangential directions therefrom to connect with said spacers by welding.

JOSEPH R. MAHAN.

REFERENCES CITED

The following references are of record in the file of this patent:

UNITED STATES PATENTS

| Number | Name | Date |
|---|---|---|
| 1,247,681 | Howard | Nov. 27, 1917 |
| 1,383,824 | Lachman | July 5, 1921 |
| 1,471,161 | House | Oct. 16, 1923 |
| 1,638,702 | O'Brien | Aug. 9, 1927 |

FOREIGN PATENTS

| Number | Country | Date |
|---|---|---|
| 320,683 | Germany | Jan. 21, 1919 |
| 149,653 | Great Britain | Aug. 4, 1921 |
| 44,317 | France | Dec. 24, 1934 |